(12) United States Patent
Nabeiro

(10) Patent No.: US 10,952,560 B2
(45) Date of Patent: Mar. 23, 2021

(54) BEVERAGE PREPARATION MACHINE WITH AN OPTIMIZED BEVERAGE DISCHARGE

(71) Applicant: NOVADELTA—COMERCIO E INDUSTRIA DE CAFES S.A., Lisbon (PT)

(72) Inventor: Rui Miguel Nabeiro, Campo Maior (PT)

(73) Assignee: NOVADELTA—COMÉRCIO E INDÚSTRIA DE CAFÉS S.A., Lisbon (PT)

( * ) Notice: Subject to any disclaimer, the term of this patent is extended or adjusted under 35 U.S.C. 154(b) by 418 days.

(21) Appl. No.: 15/315,045

(22) PCT Filed: May 29, 2015

(86) PCT No.: PCT/PT2015/000028
§ 371 (c)(1),
(2) Date: Nov. 30, 2016

(87) PCT Pub. No.: WO2015/183115
PCT Pub. Date: Dec. 3, 2015

(65) Prior Publication Data
US 2017/0202390 A1    Jul. 20, 2017

(30) Foreign Application Priority Data
May 30, 2014   (PT) .......................................... 107672

(51) Int. Cl.
*A47J 31/46*   (2006.01)
*A47J 31/06*   (2006.01)
(Continued)

(52) U.S. Cl.
CPC .......... *A47J 31/0621* (2013.01); *A47J 31/002* (2013.01); *A47J 31/4403* (2013.01); *A47J 31/46* (2013.01)

(58) Field of Classification Search
CPC .. A47J 31/002; A47J 31/0621; A47J 31/4403; A47J 31/46; A47J 31/0631; A47J 31/4485
(Continued)

(56) References Cited

U.S. PATENT DOCUMENTS

| 4,882,982 A | * | 11/1989 | Muttoni | .............. A47J 31/0605 99/295 |
| 5,322,005 A | * | 6/1994 | Enomoto | ................ A47J 31/42 241/100 |

(Continued)

FOREIGN PATENT DOCUMENTS

| EP | 2 253 253 A1 | 11/2010 |
| FR | 2 513 106 A1 | 3/1983 |

(Continued)

OTHER PUBLICATIONS

International Search Report of PCT/PT2015/000028 dated Nov. 12, 2015.
(Continued)

*Primary Examiner* — Tu B Hoang
*Assistant Examiner* — Masahiko Muranami
(74) *Attorney, Agent, or Firm* — Sughrue Mion, PLLC

(57) ABSTRACT

A machine for preparing aromatic beverages by extraction, such as espresso coffee and similar beverages. The machine comprises at least one optimized beverage discharge disposition, in particular presenting a first and second flow sections separated by a throttling section that configures a double deflection of the prevailing flow direction, so that it provides a streamlining of the discharge flow.

15 Claims, 3 Drawing Sheets

(51) Int. Cl.
*A47J 31/44* (2006.01)
*A47J 31/00* (2006.01)

(58) Field of Classification Search
USPC .................................................. 99/299, 300
See application file for complete search history.

(56) References Cited

U.S. PATENT DOCUMENTS

| 2003/0005826 | A1* | 1/2003 | Sargent | B65D 85/8043 |
| | | | | 99/279 |
| 2006/0000364 | A1* | 1/2006 | Lau | A47J 31/4496 |
| | | | | 99/295 |
| 2010/0288135 | A1 | 11/2010 | Reyhanloo | |
| 2014/0332101 | A1* | 11/2014 | Etter | A47J 31/22 |
| | | | | 137/561 R |

FOREIGN PATENT DOCUMENTS

| GB | 618762 A | 2/1949 |
| WO | 2008/151910 A1 | 12/2008 |
| WO | 2013/020940 A1 | 2/2013 |

OTHER PUBLICATIONS

Written Opinion of the International Searching Authority of PCT/PT2015/000028 dated Nov. 12, 2015.

* cited by examiner

BEVERAGE PREPARATION MACHINE WITH AN OPTIMIZED BEVERAGE DISCHARGE

CROSS REFERENCE TO RELATED APPLICATIONS

This application is a National Stage of International Application No. PCT/PT2015/000028 filed May 29, 2015, claiming priority based on Portuguese Patent Application No. 107672 filed May 30, 2014, the contents of all of which are incorporated herein by reference in their entirety.

FIELD OF THE INVENTION

The present invention refers to the field of the machines for preparing beverages by means of extraction, in particular machines presenting a beverage discharge disposition for optimizing the discharge flow.

BACKGROUND OF THE INVENTION

The discharge of beverage is a relevant aspect in the perception of quality of said beverage by a consumer, in particular in the case of aromatic beverages with production of crème, such as for example espresso coffee. Along the beverage discharge there may occur substantial pockets of air in the flow leading to an irregular discharge of said beverage, hiccups wise, affecting the formation of crème and the visual aspect of the beverage in a respective recipient.

The prior art includes several solutions relating to beverage discharge dispositions in machines for preparing beverages by means of extraction, in particular coffee machines, adapted so as to provide the removal of said pockets of air, that is, providing a streamlining of the beverage flow at the exit of said beverage discharge.

Document U.S. Pat. No. 4,194,651 discloses mixing and discharge means including a beverage discharge disposition that presents two flow sections for connecting a beverage extraction zone to a beverage discharge zone and that presents an inclined bottom surface and an air exhaust opening in the top surface, and a second flow section presents the form of a vertical conduct of smaller diameter than said first flow section. Moreover, the exhaustion opening is provided inside of the machine body, which constrains its efficacy.

Document EP 1658001 B1 discloses a machine for preparing beverages comprising a discharge flow disposition that presents two flow sections disposed successively in the flow direction and separated by a flow throttling section. In this case, the upstream flow section provides an initial flow accumulation zone and the downstream flow section presents the form of a inclined conduct of circular section.

It thus results the need of further optimizing the beverage discharge disposition, in particular in view of a greater constructive simplicity and reliability of operation thereof.

GENERAL DESCRIPTION OF THE INVENTION

The objective of the present invention is to provide a machine for preparing beverages, notably by means of extraction of aromatic substances such as for example espresso type coffee, tea and similar, eventually provided in single dose packages such as for example packages, pods and similar, that provides enhanced beverage discharge flow conditions with a simple construction.

This objective is attained according to the present invention by means of a machine for preparing beverages according to the present disclosure.

DESCRIPTION OF THE FIGURES

The invention shall be described hereinafter in greater detail based upon preferred embodiments and the attached Figures.

The Figures show.

DETAIL DESCRIPTION OF THE INVENTION

Figure 1:
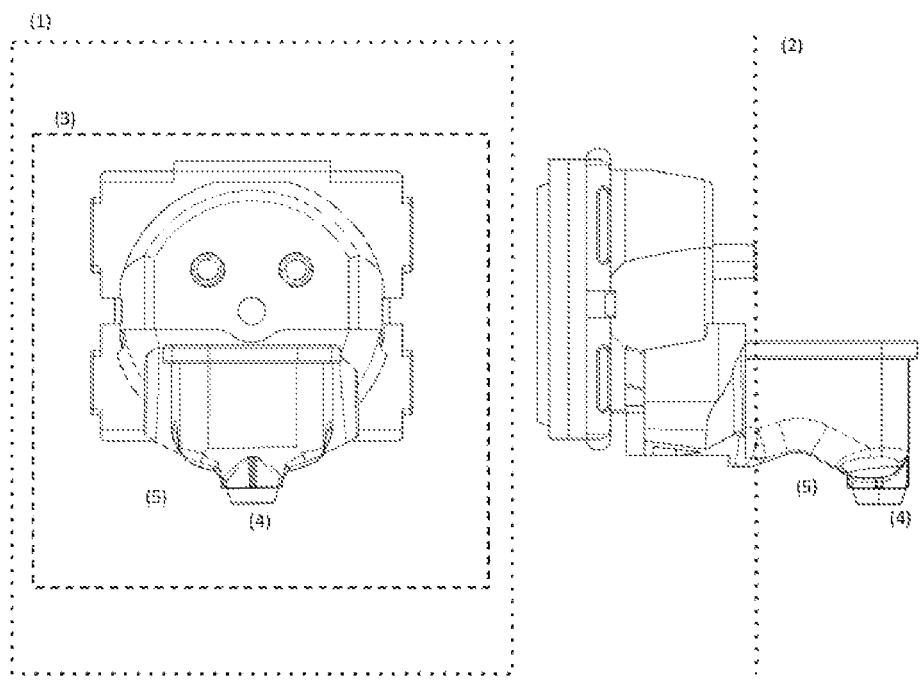
FIG. 1: side and front views of part of a machine (1) for preparing beverages according to the present invention, presenting a beverage discharge disposition (5)

FIG. 1 represents front views (on the left) and side views (on the right), of a machine (1) for preparing beverages according to the present invention, in particular aromatic beverages such as espresso coffee and similar, based upon the extraction of a single dose eventually provided in a respective package, and presenting at least one extraction device (3) and a respective flow discharge disposition (5) that is provided for flow connection between said extraction device (3) and a beverage discharge (4). Machines (1) for preparing beverages of this type are widely known in the prior art so that only an indicative form is represented as to the relative position of a respective machine body (2) (indicated in dotted line).

As represented in front view and known in the prior art, a flow discharge disposition (5) is usually arranged next to an extraction device (3) (indicated in dashed lines) and between the latter and at least one beverage discharge (4).

The flow discharge disposition (5) can be arranged inside of said machine body (2) or at least partially outside thereof, so that the beverage discharge (4) can deliver the beverage to a respective beverage recipient usually disposed directly underneath.

Figure 2:
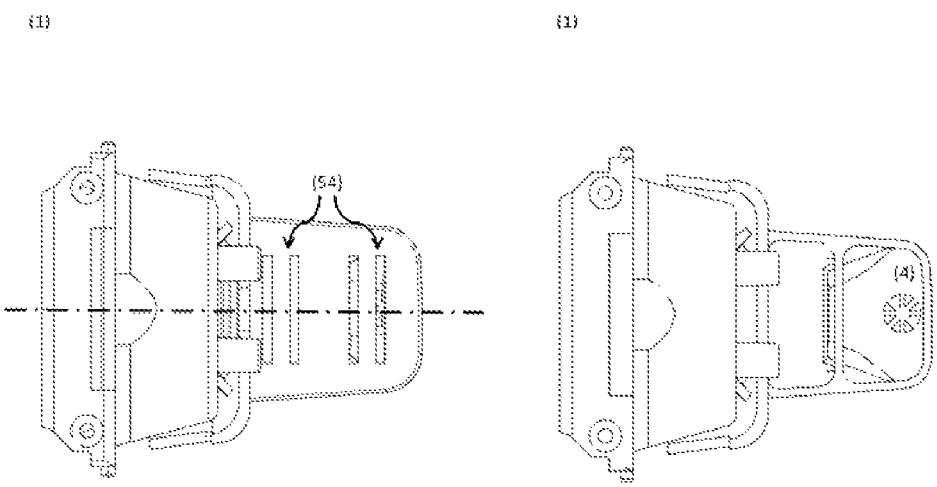
FIG. 2: Top and bottom side views of the beverage discharge disposition (5) according to FIG. 1.

FIG. 2 represents top views (left side) and bottom (right side) of said flow discharge disposition (5).

As one can observe in the top view vista, the flow discharge disposition (5) presents a plurality of exhaustion openings (54) adapted for the exhaustion of gases released by the discharge flow when flowing through said flow discharge disposition (5). In the case of this preferred embodiment, and as it shall be visible in FIG. 3, each of the first and second flow sections (51, 52) presents two exhaustion openings (54) configured with a straight elongated form and disposed successively along the prevailing flow direction.

Further in the case of this embodiment and as one can observe in the bottom view, the beverage discharge (4) presents a plurality of discharge passageways (41).

Figure 3:
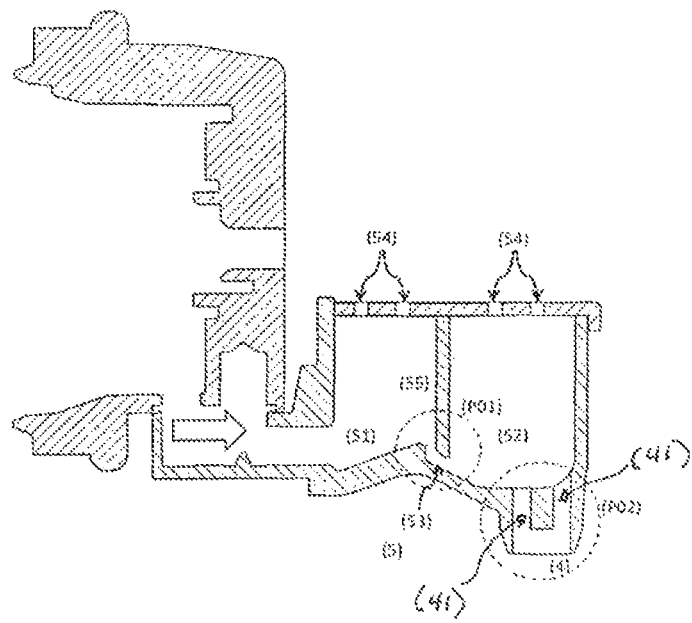
FIG. 3: cut view of the embodiment of beverage discharge disposition (5) according to the A-A cut of FIG. 2.

FIG. 3 represents the view along the A-A cut according to FIG. 2.

As one can observe, according to an inventive aspect, the flow discharge disposition (5) presents a first and second section (51, 52) disposed successively along the prevailing flow direction and separated by a throttling section (53) that presents a substantially smaller flow passage area than said first and second flow sections (51, 52), and said flow sections (51, 52) present at least one exhaust opening (54) adapted so that it can provide an air exit, whereby said throttling section (53) configures a double deflection of the prevailing flow direction, so that the downstream flow has a similar flow direction as the upstream flow. This particular configuration of said throttling section (53) provides two flow collision surfaces in a relatively reduced space, so that it results in the release of gas pockets mixed in the liquid flow and the resulting streamlining of the beverage flow before it exits through said beverage discharge (4). The released gases are exhausted through the exhaust openings (54) provided in the top surface of said first and second flow sections (51, 52).

In the case of the represented embodiment, the beverage flow exits the extraction device (3) along a substantially horizontal direction. According to the represented embodiment, said throttling section (53) configures a first deflection of the flow direction from substantially horizontal to substantially vertical, and a second deflection of the flow direction from substantially vertical to substantially horizontal, along the prevailing flow direction, until reaching said beverage discharge (4) that is arranged in a substantially vertical direction.

According to the represented embodiment, said throttling section (53) is jointly defined by a throttling wall (55) and the top surface of said first and second flow sections (51, 52), whereby said throttling wall (55) extends in a substantially vertical manner between said first and second flow sections (51, 52) and toward the interior surface of the throttling section (53). The space between the distal end of the throttling wall (55) and the interior surface of the throttling section (53) throttles the fluid passing between the first and second flow sections (51, 52).

Moreover, the bottom surface of said first flow section (51) presents a substantially horizontal part in the upstream region and a substantially inclined plane in the downstream region, so that there is induced an acceleration of the beverage flow approaching said throttling section (53). The bottom surface of said first flow section (51) presents a substantially vertical part disposed so as to form an elbow-like element in the upstream region of connection to said second flow section (52).

Figure 4:
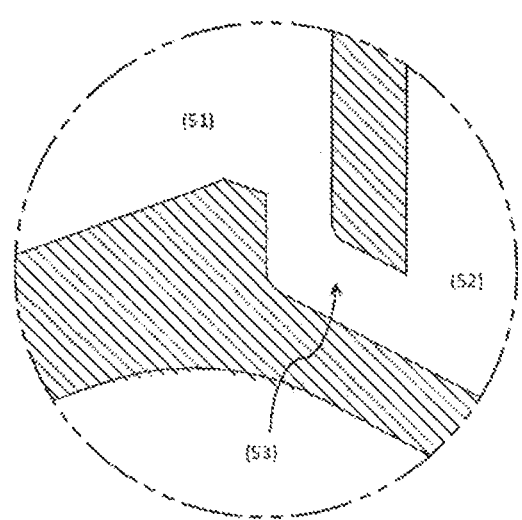
FIG. 4: detail view P01 of the beverage discharge disposition (5) according to FIG. 3.

FIG. 4 represents an enlarged view of the detail P01 according to FIG. 3.

Said throttling section (53) is provided as a single flow passageway. Alternatively, said throttling section (53) can be provided with a plurality of flow passageways.

As further represented in FIG. 3, said second flow section (52) presents a descending inclined wall upstream and a substantially horizontal wall downstream. Moreover, the bottom surface of said second flow section (52) presents a basin-like form including the beverage discharge (4) in a at least approximately central region thereof.

Figure 5:
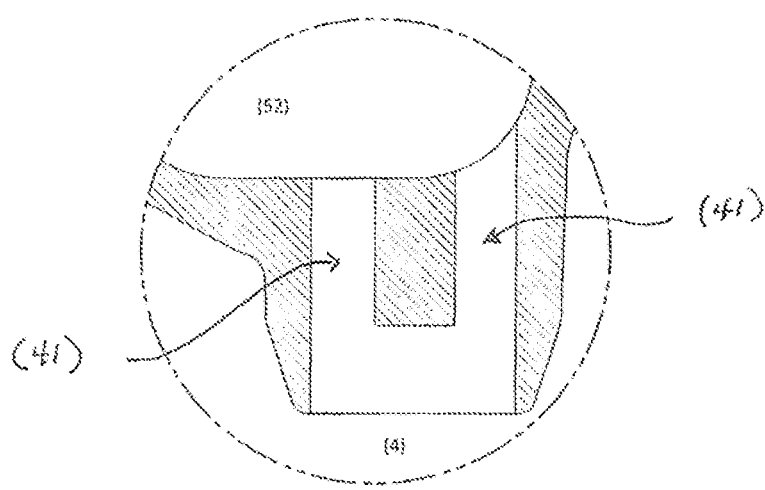
FIG. 5: Detail view P02 of the beverage discharge disposition (5) according to FIG. 3.

FIG. 5 represents an enlarged view of the detail P02 according to FIG. 3. As represented, the beverage discharge (4) presents a plurality of discharge passageways (41) disposed in region downstream of said second flow section (52).

The invention claimed is:

1. A machine (1) adapted for the preparation of aromatic beverages comprising:
   a machine body (2),
   at least one extraction device (3) adapted for an extraction of a dose of a beverage ingredient,
   at least one beverage discharge (4) disposed downstream of said at least one extraction device (3), and
   a flow discharge disposition (5) providing a flow connection for a flow of a liquid between said at least one extraction device (3) and said at least one beverage discharge (4),
   whereby said flow discharge disposition (5) comprises first and second flow sections (51, 52) arranged horizontally along a horizontal flow direction and separated horizontally by a throttling section (53),
   wherein each of said first flow section, said second flow section and said throttling section has a horizontally oriented flow passage area,
   wherein said first flow section comprises an inclined plane that is ascending in a downstream section thereof,
   wherein said throttling section has a vertically extending throttling wall (55) with a distal end that extends downwardly toward a common wall which comprises a top surface of the first flow section (51) and a top surface of the second flow section (52) and presents a smaller horizontally oriented flow passage area between the distal end of the throttling wall (55) and said common wall than an area of said first and second flow sections (51, 52),
   wherein each of said first and second flow sections (51, 52) comprises at least one exhaustion opening (54) disposed vertically above said horizontal flow direction and adapted so that said at least one exhaustion opening can provide for air to exit from said flow discharge disposition (5), and
   wherein said throttling section (53) provides in succession a first deflection of the flow of liquid in a downward direction before the distal end of the throttling wall (55) and a second deflection of the flow of liquid in a lateral direction upon encountering the common wall at the distal end of the throttling wall (55).

2. The machine (1) according to claim 1, wherein said throttling section (53) configures a first deflection of flow direction from horizontally oriented to vertically oriented and a second deflection of flow direction from vertically oriented to horizontally oriented, along the flow directions.

3. The machine (1) according to claim 1, said throttling section (53) is jointly defined by said throttling wall (55) and an interior surface of said first and second flow sections (51, 52), whereby said throttling wall (55) extends downward from a horizontal wall in a vertical manner between said first and second flow sections (51, 52).

4. The machine (1) according to claim 1, wherein said wall common to the first and second flow sections, toward which said distal end of said throttling wall (55) extends vertically, comprises an upstream interior surface of said throttling section (53).

5. A machine (1) adapted for the preparation of aromatic beverages comprising:
   a machine body (2),
   at least one extraction device (3) adapted for an extraction of a dose of a beverage ingredient,
   at least one beverage discharge (4) disposed downstream of said at least one extraction device (3), and
   a flow discharge disposition (5) providing a flow connection for a liquid flow between said at least one extraction device (3) and said at least one beverage discharge (4),
   whereby said flow discharge disposition (5) has an enclosed top and comprises first and second flow sections (51, 52) arranged along a lateral flow direction from upstream to downstream and separated by a throttling section (53), having a throttling wall (55) extending downward from said top to a distal end, separating said first and second flow sections (51, 52), said distal end comprising a smaller flow passage area than said first and second flow sections (51, 52), and said first and second flow sections (51, 52) comprise at least one exhaustion opening (54) in said enclosed top that is adapted so that said at least one exhaustion opening can provide for air to exit from said flow discharge disposition (5), wherein said throttling section (53) configures a first deflection of the flow of liquid in a downward direction and a second deflection of the flow of liquid in a lateral direction, and wherein an interior surface of said first flow section (51) comprises a horizontal part in an upstream region and an ascending inclined part in a downstream region of said first flow section (51).

6. The machine (1) according to claim 1, wherein an interior surface of said first flow section (51) presents a vertically oriented part disposed so as to form an elbow-shaped element in a downstream region of connection with said second flow section (52).

7. The machine (1) according to claim 1, wherein said throttling section (53) comprises a plurality of flow passageways.

8. A machine (1) adapted for the preparation of aromatic beverages comprising:
a machine body (2),
at least one extraction device (3) adapted for an extraction of a dose of a beverage ingredient,
at least one beverage discharge (4) disposed downstream of said extraction device (3), and
a flow discharge disposition (5) providing a flow connection for a liquid flow between said extraction device (3) and said at least one beverage discharge (4),
whereby said flow discharge disposition (5) has an enclosed top and comprises first and second flow sections (51, 52) arranged along a lateral flow direction from upstream to downstream and separated by a throttling section (53) having a throttling wall (55) extending downward from said top to a distal end, separating said first and second flow sections (51, 52), said distal end comprising a smaller flow passage area than said first and second flow sections (51, 52), and said first and second flow sections (51, 52) comprise at least one exhaustion opening (54) in said enclosed top that is adapted so that said at least one exhaustion opening can provide for air to exit from said flow discharge disposition (5), wherein said throttling section (53) configures a first deflection of the liquid flow in a downward direction and a second deflection of the liquid flow in a lateral direction, and wherein an interior surface of said second flow section (52) comprises a descending inclined wall in an upstream part thereof and a horizontal wall in a downstream part.

9. The machine (1) according to claim 1, wherein an interior surface of said second flow section (52) comprises a basin-like form including said at least one beverage discharge (4) in at least a central region.

10. The machine (1) according to claim 1, wherein said at least one beverage discharge (4) is provided in a downstream region of said second flow section (52).

11. The machine (1) according to claim 1, wherein said machine (1) comprises a plurality of discharge passageways (41).

12. The machine (1) according to claim 1, wherein said first and second flow sections (51, 52) comprise at least one exhaustion opening (54) in respective top surfaces.

13. The machine (1) according to claim 1, wherein said at least one exhaustion opening (54) is provided inside of the machine body (2) or in connection with an exterior of the machine body (2).

14. The machine (1) according to claim 1, wherein said at least one exhaustion opening (54) is provided successively along the flow direction and with a straight and elongated form.

15. The machine (1) according to claim 1, wherein said at least one exhaustion opening (54) is provided in a matrix-like distribution and comprises holes of circular form.

* * * * *